United States Patent [19]

Kardach

[11] Patent Number: 5,612,756
[45] Date of Patent: Mar. 18, 1997

[54] SUPPORT FOR VIDEO CAMERA

[75] Inventor: Gerald E. Kardach, South Milwaukee, Wis.

[73] Assignee: Lionshead Publishing Ltd., Frisco, Colo.

[21] Appl. No.: 555,899

[22] Filed: Nov. 13, 1995

[51] Int. Cl.$^6$ ................................................. G03B 29/00
[52] U.S. Cl. ........................................................ 396/422
[58] Field of Search ................................... 354/82, 293

[56] References Cited

U.S. PATENT DOCUMENTS

| | | | |
|---|---|---|---|
| D. 324,874 | 3/1992 | Kardach | D16/243 |
| 2,712,779 | 7/1955 | Tolcher | 354/82 |
| 4,727,390 | 2/1988 | Brown | 354/82 |
| 4,963,904 | 10/1990 | Lee | 354/82 |
| 5,424,791 | 6/1995 | Campbell | 354/82 |

*Primary Examiner*—David M. Gray
*Attorney, Agent, or Firm*—Ryan, Maki, Mann & Hohenfeldt

[57] ABSTRACT

A shoulder support for a video camera includes a support body formed of two components. The components are adjustable relative to each other lengthwise and angularly to provide adjustable support for a video camera by videographers varying stature. A wedge-shaped cushion is provided for engagement with the videographer's shoulder for comfort and firm support. An accessory mount and handle are positioned on the support and may be interchanged in position, and alternative embodiments are provided to permit support of the camera in a forward or rearward position.

7 Claims, 3 Drawing Sheets

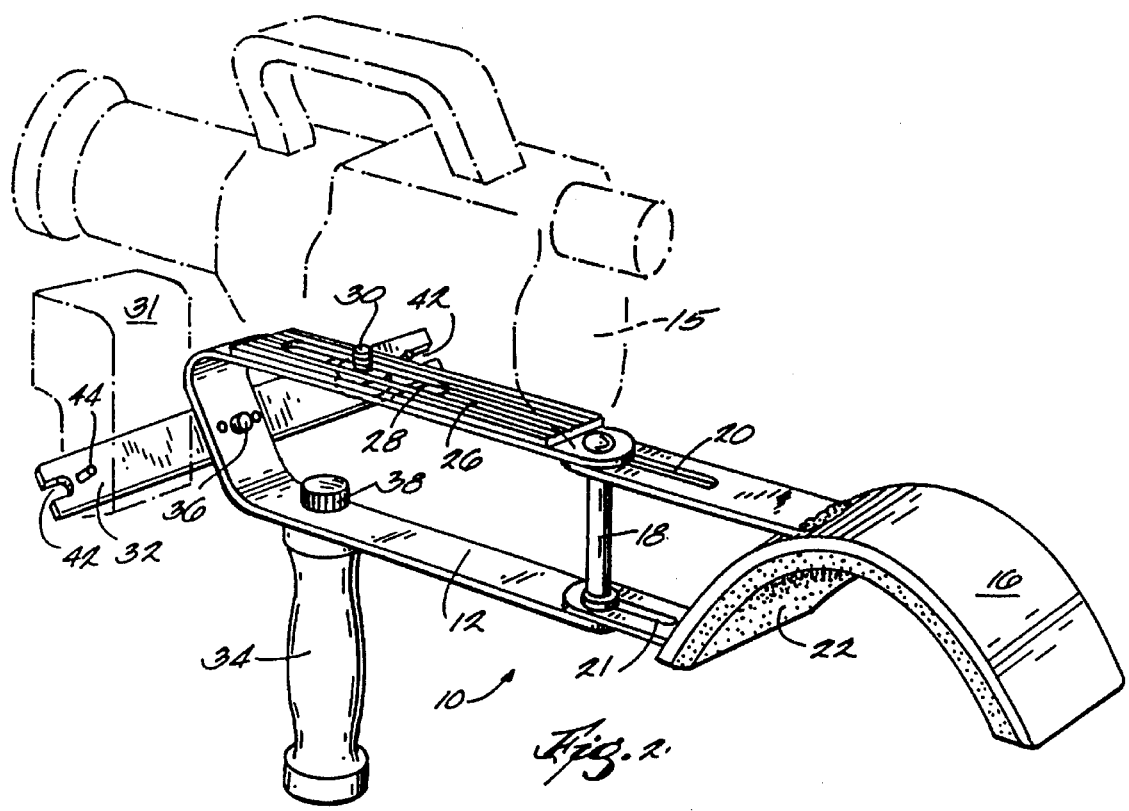
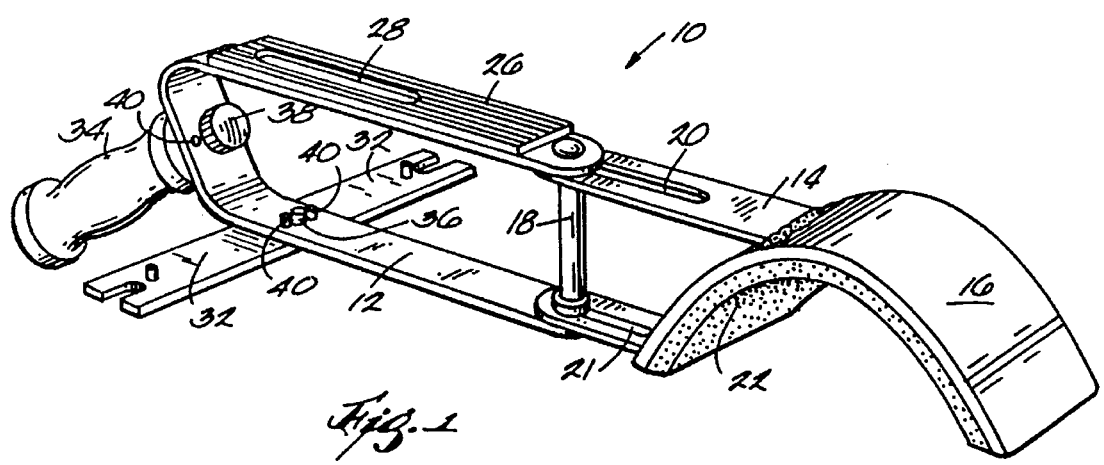

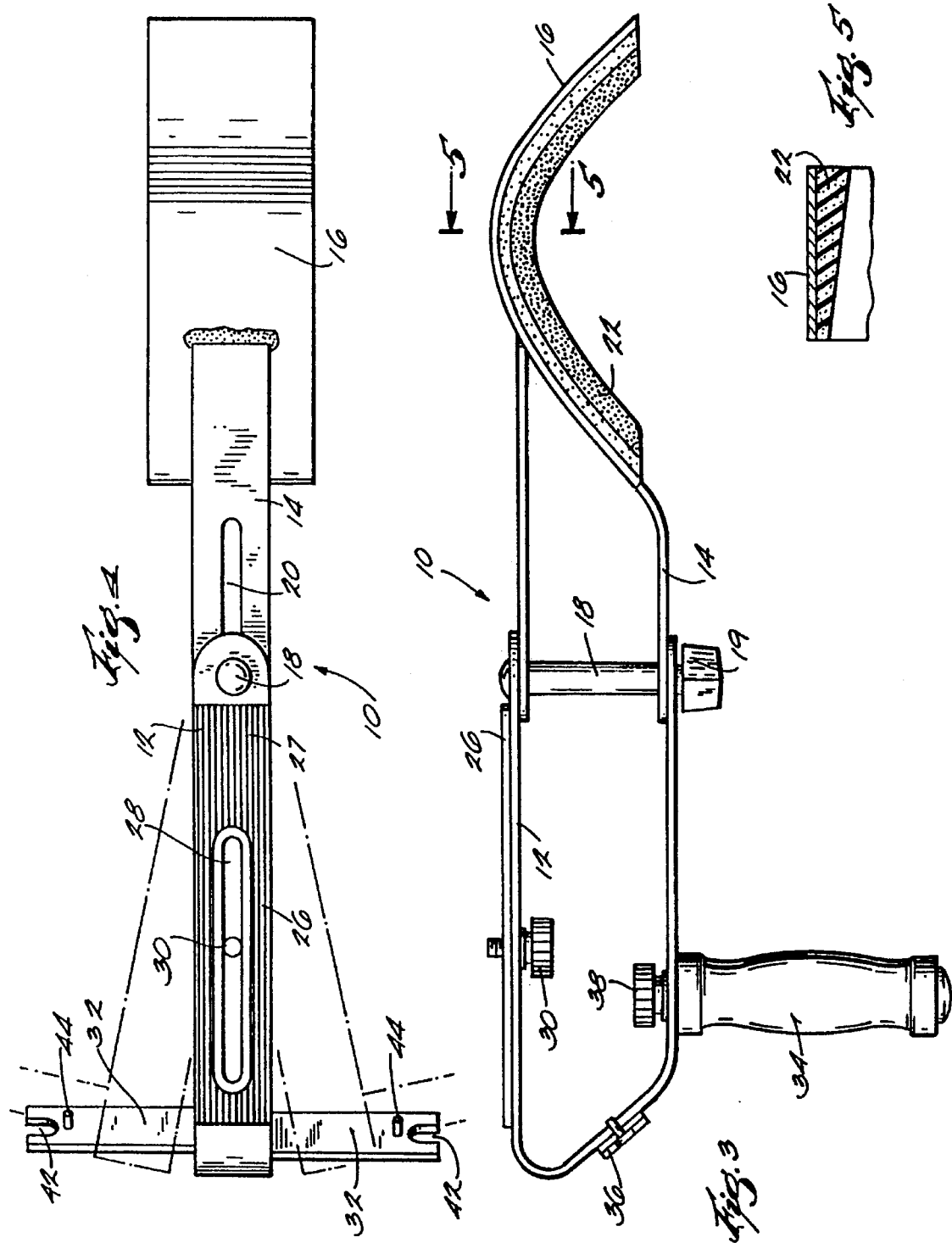

SUPPORT FOR VIDEO CAMERA

FIELD OF THE INVENTION

This invention relates to supports for video cameras. More specifically, the invention relates to an adjustable support for a video camera partly supported on the shoulder of a cameraman.

1. Background of the Invention

In my earlier Design patent application Ser. No. 498,591 filed Mar. 12, 1990, now U.S. Pat. No. D 324874, I have described a simple support for a video camera. The support shown therein is useful in a number of applications for supporting cumbersome video cameras. A need, however, has continued to exist for such supports that have greater versatility and applicability to other types of cameras.

2. Summary of the Invention

It is a principal object of the present invention to provide a support for a video camera that can be supported at one end on a videographer's shoulder and by the videographer's forearm and hand at the opposite or forward end. An important aspect of the invention is the provision of such a support that is adjustable lengthwise and angularly along its length to accommodate the stature of various videographers as well as the configurations of various types of video cameras.

Another aspect of the invention relates to providing a camera support having mounts for various accessories. In accordance with still another aspect, the handle, accessory and camera supporting mounts are all removable and provision can be made for attaching them to the support in various alternative positions, in order to provide still greater versatility to the support assembly.

In accordance with yet another aspect, the shoulder-engaging portion of the support is furnished with a shoulder-engaging cushion that is laterally wedge-shaped and thus improves the comfort to the videographer as well as the firmness and stability of the support provided to the supported video camera.

Still further, objectives and advantages of the invention will be apparent from the following detailed description, the claims, and the accompanying drawings.

BRIEF DESCRIPTION OF THE DRAWINGS

FIG. 1 is a perspective view of a video camera support of this invention;

FIG. 2 is a perspective view of the support of FIG. 1 with attachments shown mounted in an alternative arrangement with video camera and accessories shown by phantom lines;

FIG. 3 is a side elevational view of the attachment shown in FIG. 2;

FIG. 4 is a top plan view of the attachments shown in FIG. 2 with alternate optional positions thereof shown by phantom lines;

FIG. 5 is a sectional view taken along line 5—5 of FIG. 3; and

DETAILED DESCRIPTION OF PREFERRED EMBODIMENT

Figure 6:
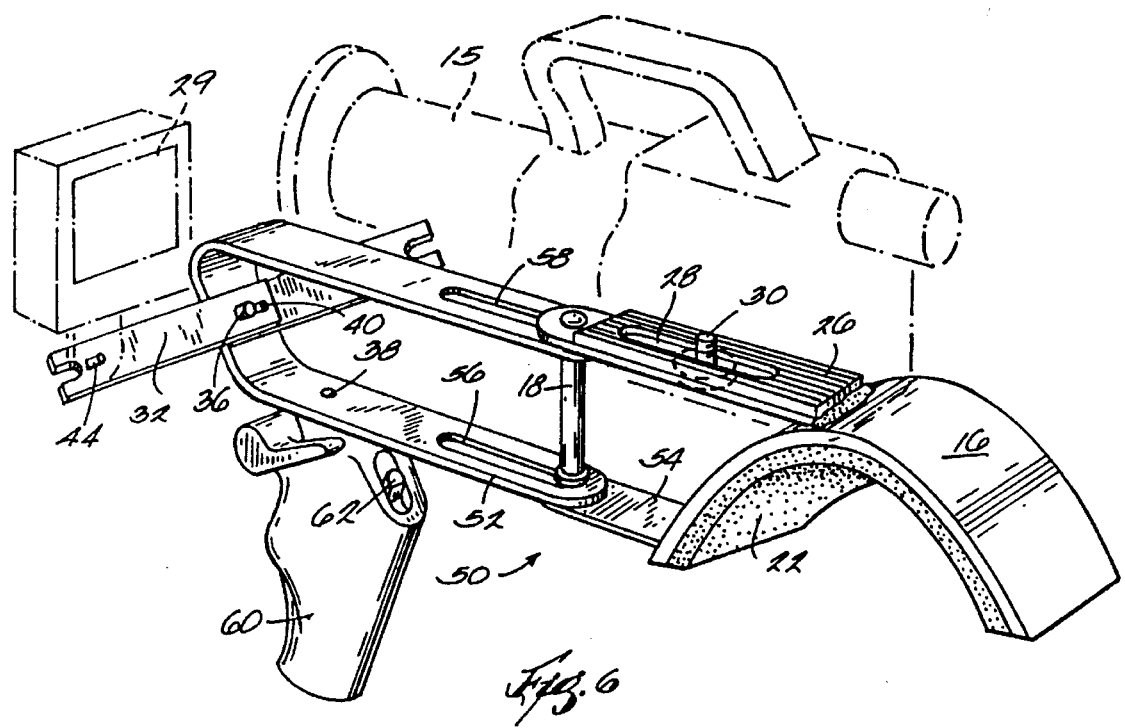
FIG. 6 is perspective view showing an alternative embodiment of the invention with accessories and camera shown by phantom lines.

Referring more specifically to the drawings, there is seen an adjustable video camera support 10 of this invention. Support 10 is formed of two generally elongated components 12 and 14 respectively. Rearward component 14 is provided 10 with a downwardly facing concave end 16 for engagement with the shoulder of a videographer. Components 12 and 14 are formed of upper and lower portions, as shown, which are adjustably coupled together with a pivot pin or bolt 18. Preferably bolt 18 is threaded and provided with a mating thumb nut 19. In the illustrated embodiment component 12 is U-shaped to provide the upper and lower portions. At least one of the body components, in this case component 14 is provided with a pair of elongated slots 20 and 21. Slots 20 and 21 enable the adjustable coupling of components 12 and 14 together so that the overall length of the support 10 may be increased or decreased as desired. Also the angle between the longitudinal axes of components 12 and 14 can be adjusted according to the requirements or desires of an individual videographer, as illustrated by phantom lines in FIG. 4.

Concave end 16 is provided with a generally laterally wedge-shaped foam support 22 for engagement of with the shoulder of a videographer 24 as shown. This shape 22 has been found to increase comfort in the use of support 10 by conforming in general fashion to the videographer's shoulder, thereby also increasing the lateral stability of the support provided to camera 15.

At least one supporting pad 26 is attached to an upper surface of at least one of components 12 and 14 for supporting a camera 15. Pad 26 is preferably formed of a rubber material and provided with a grooved surface 27 for engagement with the bottom of camera 15. A hole, or slot 28 for receiving a mounting bolt 30 extends through the component 12 or 14 on which supporting pad 26 is located.

Also attached to support 10 are one or more accessory support bars 32 and removable handle 34. Accessory bars 32 can be used to support a variety of accessory components such as microphones, monitor screens 29, strobes or flash attachments 31, etc. It will be noted from FIGS. 1 & 2 that accessory bars 32 and handle 34 can be reversed in position if desired in order to place most conveniently arrange the particular array of accessories and camera 15 being used. Thus, such reversal can be accomplished easily to accommodate the desires of a particular videographer by removing and reattaching thumbscrews 36 and 38, which are threadably received in threaded holes in component 12. Locator pins 40 are preferably provided on accessory bars 32 and are receivable in locator holes provided through member 12 spaced a short distance from the thumbscrew-receiving threaded holes. Accessory bars 32 are provided with notches 42 appropriate to receive various standard accessories for mounting on the support assembly 10. Pins 44 are provided for alignment of such accessories.

Referring to the alternative embodiment of FIG. 6, there is seen an alternative camera support 50. Support 50 is formed of components 52 and 54 which are adjustably secured together by a bolt 18 which extends through slots 56 and 58 which pass through the thickness of component 52. It will be noted that the camera support pad 26 and slot 28 for receiving a camera mounting thumb screw 30 have been moved rearwardly and attached to top surface of component 54. This enables mounting of the camera 15 in a more rearward position on support 50. This rearward orientation is made practical by the use of a video monitor 29 mounted on an accessory support bar 32 as shown by phantom lines. The videographer can then, rather than viewing the field being videotaped through an eyepiece on camera 15, watch what is being videotaped on monitor 29. A different form of handle 60 which may have switches 62 and other controls for operating the camera and monitor mounted thereon, can be attached by a thumb screw 38 to component 52 as shown.

While various preferred embodiments of the invention have been shown for purposes of illustration, it will be appreciated that various modifications may be made by those skilled in the art without departing from the true spirit of the invention.

What is claimed is:

1. A support for a video camera comprising an elongated support body formed of first and second components adjustably secured to each other by means of a releasable fastener which passes through an opening in each of said components, the opening on at least one of said components being elongated whereby the length of said body can be altered, said fastener pivotally attaching said first and second components to each other, whereby the angle between the axes of said components can be adjusted, said first and second components each being formed of upper and lower frame members, said fastener passing through opening in each of said upper and lower frame members, said support body having a forward end and rearward end with a downwardly opening concave surface for placement on the shoulder of a videographer, means on such said support body for attachment thereto of a video camera, and a hand grip attached to the forward end of said support body, said means for attachment being located rearwardly of said hand grip, a cushioning member being placed in said concave end for engagement with the videographer's shoulder.

2. A support according to claim 1 wherein said cushioning member is laterally wedge-shaped, so that, in cross section, one side of said cushioning member is thicker than an opposite side of said cushioning member.

3. A support according to claim 1, wherein said body has at least one mounting bar for video camera accessories attached thereto.

4. A support according to claim 3, further comprising a support handle removably affixed to said support and wherein said accessory support bar and said handle are adjustably attached to said support and can be reversed in position on said support.

5. A support according to claim 1 wherein a grooved rubber surface is provided for supportive contact with a camera mounted on said support.

6. A support according to claim 1 wherein a slot for receiving a camera attaching thumb screw extends through the uppermost surface of the rearward extending one of said first and second components.

7. A support according to claim 1 wherein at least one threaded hole for receiving a threaded screw for mounting a handle or accessory bar is provided in the lowermost surface of the forwardly extending one of said first and second components.

* * * * *